US009483118B2

(12) United States Patent
Golyshko et al.

(10) Patent No.: US 9,483,118 B2
(45) Date of Patent: Nov. 1, 2016

(54) METHODS AND SYSTEMS FOR SELECTING MEDIA GUIDANCE FUNCTIONS BASED ON TACTILE ATTRIBUTES OF A USER INPUT

(71) Applicant: United Video Properties, Inc., Santa Clara, CA (US)

(72) Inventors: Phil Golyshko, Pacifica, CA (US); Andy Dustin, Palos Hills, IL (US)

(73) Assignee: Rovi Guides, Inc., San Carlos, CA (US)

( * ) Notice: Subject to any disclaimer, the term of this patent is extended or adjusted under 35 U.S.C. 154(b) by 256 days.

(21) Appl. No.: 14/142,548

(22) Filed: Dec. 27, 2013

(65) Prior Publication Data

US 2015/0185840 A1    Jul. 2, 2015

(51) Int. Cl.
*G06F 3/048* (2013.01)
*G06F 3/01* (2006.01)
*G06F 3/0484* (2013.01)
*H04N 21/422* (2011.01)
*H04N 21/482* (2011.01)
*G06F 3/0488* (2013.01)
*G06F 3/0482* (2013.01)

(52) U.S. Cl.
CPC ............. *G06F 3/016* (2013.01); *G06F 3/0482* (2013.01); *G06F 3/0488* (2013.01); *G06F 3/04842* (2013.01); *H04N 21/42224* (2013.01); *H04N 21/482* (2013.01)

(58) Field of Classification Search
CPC .... G06F 3/016; G06F 3/0488; G06F 3/0414; G06F 2203/013
See application file for complete search history.

(56) References Cited

U.S. PATENT DOCUMENTS

| 6,239,794 | B1 | 5/2001 | Yuen et al. |
| 6,388,714 | B1 | 5/2002 | Schein et al. |
| 6,509,848 | B1 | 1/2003 | Ogata et al. |
| 6,564,378 | B1 | 5/2003 | Satterfield et al. |
| 6,756,997 | B1 | 6/2004 | Ward, III et al. |
| 7,165,098 | B1 | 1/2007 | Boyer et al. |
| 7,761,892 | B2 | 7/2010 | Ellis et al. |
| 8,046,801 | B2 | 10/2011 | Ellis et al. |
| 9,030,419 | B1* | 5/2015 | Freed ............... G06F 3/0416 345/156 |
| 2002/0120925 | A1 | 8/2002 | Logan |
| 2002/0174430 | A1 | 11/2002 | Ellis et al. |
| 2003/0080946 | A1* | 5/2003 | Chuang ............. G06F 3/0418 345/173 |
| 2003/0110499 | A1 | 6/2003 | Knudson et al. |
| 2003/0122779 | A1* | 7/2003 | Martin ............. G06F 1/1662 345/156 |
| 2005/0251827 | A1 | 11/2005 | Ellis et al. |
| 2007/0009229 | A1 | 1/2007 | Liu |
| 2008/0216124 | A1 | 9/2008 | Dekkers |
| 2009/0122079 | A1 | 5/2009 | Nishioka |
| 2009/0174677 | A1* | 7/2009 | Gehani ............ G06F 3/04847 345/173 |

(Continued)

FOREIGN PATENT DOCUMENTS

WO    WO-2012166279 A1    12/2012

OTHER PUBLICATIONS

International Search Report and Written Opinion for PCT/US2014/071407 dated Apr. 17, 2015.

*Primary Examiner* — Tadeese Hailu

(74) *Attorney, Agent, or Firm* — Ropes & Gray LLP

(57) ABSTRACT

Methods and systems are disclosed herein for a media guidance application that determines the tactile attributes (e.g., an amount of pressure applied by a user, a length of time pressure is applied by a user, a velocity of the user input, etc.) associated with a received user input and determines which media guidance function, of a plurality of media guidance functions, is associated with the tactile attributes.

20 Claims, 4 Drawing Sheets

(56) References Cited

U.S. PATENT DOCUMENTS

| | | | |
|---|---|---|---|
| 2010/0026640 A1* | 2/2010 | Kim | G06F 3/0414 345/173 |
| 2010/0153885 A1 | 6/2010 | Yates | |
| 2010/0308844 A1 | 12/2010 | Day et al. | |
| 2011/0050576 A1* | 3/2011 | Forutanpour | G06F 3/04886 345/168 |
| 2011/0050653 A1* | 3/2011 | Miyazawa | G06F 3/0482 345/179 |
| 2011/0134043 A1* | 6/2011 | Chen | G06F 3/023 345/168 |
| 2011/0221684 A1* | 9/2011 | Rydenhag | G06F 3/041 345/173 |
| 2011/0292299 A1 | 12/2011 | Lau et al. | |
| 2012/0113061 A1 | 5/2012 | Ikeda | |
| 2012/0126962 A1* | 5/2012 | Ujii | G06F 3/0414 340/407.2 |
| 2012/0147052 A1* | 6/2012 | Homma | G06F 3/044 345/660 |
| 2012/0183271 A1* | 7/2012 | Forutanpour | G06F 17/30817 386/224 |
| 2012/0293448 A1 | 11/2012 | Dietz et al. | |
| 2012/0306766 A1* | 12/2012 | Moore | G06F 3/04883 345/173 |
| 2012/0319937 A1 | 12/2012 | Lee et al. | |
| 2013/0110974 A1* | 5/2013 | Arrasvuori | H04L 67/18 709/217 |
| 2013/0257817 A1 | 10/2013 | Yliaho | |
| 2014/0160010 A1* | 6/2014 | Jung | G06F 3/0414 345/156 |
| 2015/0160779 A1* | 6/2015 | Huang | G06F 3/0418 345/174 |

* cited by examiner

METHODS AND SYSTEMS FOR SELECTING MEDIA GUIDANCE FUNCTIONS BASED ON TACTILE ATTRIBUTES OF A USER INPUT

BACKGROUND

In addition to providing users with a plethora of media content, modern media systems typically supply users with options to play content, select different content, or access additional information about content as well as numerous other features. To organize and provide access to these numerous features, typical media systems generate interactive menus for users. While interactive menus allow users access to these numerous features, these complex menus, featuring a multitude of categories and sub-categories, are not only difficult to navigate but also time intensive. Furthermore, while the extent of interactive menus necessary may be reduced by providing more inputs on a device (e.g., buttons on a remote), additional inputs often clutter the device, making operation of the device difficult.

SUMMARY

Accordingly, methods and systems are disclosed herein for a media guidance application that reduces the need for complex menus without requiring additional inputs on a device by initiating media guidance functions based on tactile attributes of a user input. For example, when receiving a user input, the media guidance application may determine the tactile attributes (e.g., an amount of pressure applied by a user, a length of time pressure is applied by a user, a velocity of a user selection, etc.) associated with the received user input and determine which function, of a plurality of functions, is associated with the tactile attributes. By making determinations based on the tactile attributes, the media guidance application can associate multiple functions with a single user input without requiring a user to navigate additional menus.

In some aspects, the media guidance application receives a user input and determines an amount of pressure applied by a user associated with the user input. The media guidance application then cross-references the amount of pressure applied by the user with a database listing a plurality of media guidance functions each associated with a different amount of pressure to determine a media guidance function associated with the amount of pressure applied by the user. The media guidance application then selects the media guidance function from the plurality of media guidance functions and performs the media guidance function in response to the user input.

In some embodiments, each of the plurality of media guidance functions is associated with a different fast-access playback operation. For example, a first fast-access playback operation may be a rewind operation and a second fast-access playback operation may be a start over operation. Depending on the amount of pressure applied by a user during the user input, the media guidance application determines whether to rewind a media asset (e.g., if less pressure is applied) or start over the media asset (e.g., if more pressure is applied).

In some embodiments, each of the plurality of media guidance functions is associated with a different fast-access playback operation speed. For example, a first fast-access playback operation speed may be a two frame skip fast-forward speed and a second fast-access playback operation speed may be a four frame skip fast-forward speed. Depending on the amount of pressure applied by a user during the user input, the media guidance application determines whether to fast-forward at a two frame skip speed (e.g., if less pressure is applied) or fast-forward at a four frame skip speed (e.g., if more pressure is applied).

In some embodiments, a first media guidance function of the plurality of media guidance functions may relate to replacing current content with new content on a display device and a second media guidance function of the plurality of media guidance functions may relate to presenting the new content simultaneously with the current content on the display device. For example, depending on the amount of pressure applied by a user during the user input, the media guidance application determines whether to present the new content in a picture-in-a-picture window overlaid on the current content (e.g., if less pressure is applied) or replace current content with new content (e.g., if more pressure is applied).

In some embodiments, each of the plurality of media guidance functions may be associated with a different channel scan speed. For example, depending on the amount of pressure applied by a user during the user input, the media guidance application determines whether to scan channels at a rate of one channel every two seconds (e.g., if less pressure is applied) or scan channels at a rate of one channel every second (e.g., if more pressure is applied).

In some embodiments, each of the plurality of media guidance functions is associated with a different number of user devices affected by the media guidance function. For example, depending on the amount of pressure applied by a user during the user input, the media guidance application determines whether to apply the media guidance function to a single device (e.g., if less pressure is applied) or apply the media guidance function to several devices within a certain proximity (e.g., if more pressure is applied).

It should be noted, the systems and/or methods described above may be combined with, applied to, or used in accordance with, other systems, methods and/or apparatuses discussed both above and below.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which.

DETAILED DESCRIPTION OF THE DRAWINGS

Figure 1:
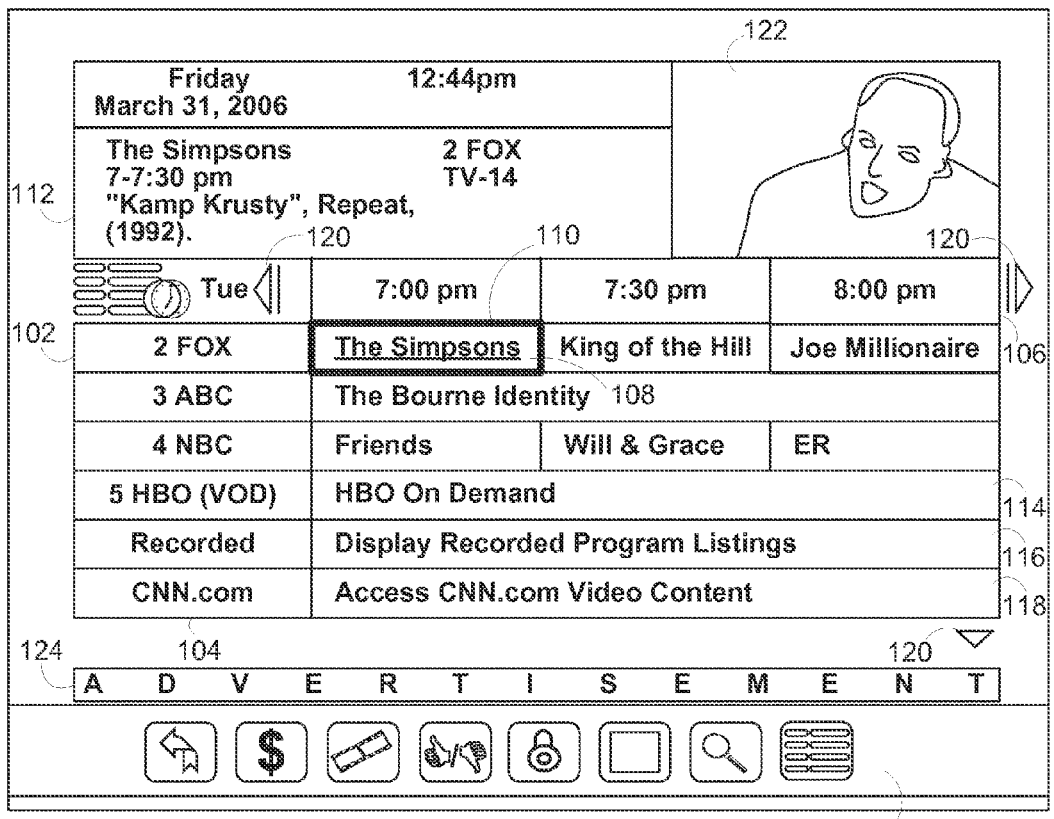
FIG. 1 shows an illustrative example of a media guidance display for navigating and selecting media assets in accordance with some embodiments of the disclosure.

Methods and systems are disclosed herein for a media guidance application that determines the tactile attributes (e.g., an amount of pressure applied by a user, a length of time pressure is applied by a user, a velocity of a user selection, etc.) associated with a received user input and determines which media guidance function, of a plurality of media guidance functions, is associated with the tactile attributes. As used herein, "a media guidance application," "interactive media guidance application," or "guidance application" refer to a form of media guidance through an interface that allows users to efficiently navigate, identify, view, playback, or obtain information about content that they may desire. In some embodiments, the media guidance application may be provided as an on-line application (i.e., provided on a website), or as a stand-alone application on a server, user device, etc. Various devices and platforms that may implement the media guidance application are described in more detail below. In some embodiments, the media guidance application and/or any instructions for performing any of the embodiments discussed herein may be encoded on computer readable media. Computer readable media includes any media capable of storing data. The computer readable media may be transitory, including, but not limited to, propagating electrical or electromagnetic signals, or may be non-transitory including, but not limited to, volatile and nonvolatile computer memory or storage devices such as a hard disk, floppy disk, USB drive, DVD, CD, media card, register memory, processor caches, Random Access Memory ("RAM"), etc.

Media guidance applications may take various forms depending on the content for which they provide guidance. One typical type of media guidance application is an interactive television program guide. Interactive television program guides (sometimes referred to as electronic program guides) are well-known guidance applications that, among other things, allow users to navigate among and locate many types of content or media assets. Interactive media guidance applications may generate graphical user interface screens that enable a user to navigate among, locate, and select content. As referred to herein, the term "media asset" should be understood to mean an electronically consumable user asset, such as television programming, as well as pay-per-view programs, on-demand programs (as in video-on-demand (VOD) systems), Internet content (e.g., streaming content, downloadable content, webcasts, etc.), video clips, audio, content information, pictures, rotating images, documents, playlists, websites, articles, books, electronic books, blogs, advertisements, chat sessions, social media, applications, games, and/or any other media or multimedia and/or combination of the same. Media guidance applications also allow users to navigate among and locate content. As referred to herein, the term "multimedia" should be understood to mean content that utilizes at least two different content forms described above. For example, text, audio, images, video, or interactivity content forms. Content may be recorded, played, displayed, or accessed by user equipment devices, but can also be part of a live performance.

In some embodiments, the media guidance application receives a user input and determines tactile attributes associated with that input. As used herein, a "tactile attribute" refers to a characteristic describing the contact between a user and a user input interface that results in a user input. For example, a tactile attribute may describe an amount of pressure applied by a user to a user input interface when making a user input, a length of time a user contacts and/or applies pressure to a user input interface in order to make a user input, a velocity at which a user touch a user input interface when making a user input, a frequency of contact between a user and a user input interface when making user inputs, how a user contacts a user input interface (e.g., by swiping, pinching, striking, rubbing, etc.) when making a user input, a direction a user contacts a user input interface (e.g., vertically, horizontally, left-to-right, right-to-left, diagonally, etc.), what a user uses to make contact with a user input interface when making a user input, and/or any other characteristic that describes the contact between a user and the user input interface when making a user input.

In some embodiments, the media guidance application cross-references the tactile attributes associated with a user input with a database listing a plurality of media guidance functions, each associated with different tactile attributes, or values of tactile attributes, to determine a media guidance function associated with the tactile attributes of the user input. As used herein, a "media guidance function," refers to any feature, operation, or service related to the consumption of a media asset and/or media guidance data. For example, a media guidance function may refer to the presentation of one or more media assets. In another example, a media guidance function may include a performance of a fast-access playback operation.

As referred to herein, the phrase "fast-access playback operations" should be understood to mean any operation that pertains to playing back a non-linear media asset at faster than normal playback speed or in a different order than the media asset is designed to be played, such as a fast-forward, rewind, skip, chapter selection, segment selection, skip segment, jump segment, next segment, previous segment, skip advertisement, or commercial, next chapter, previous chapter or any other operation that does not play back the media asset at normal playback speed. The fast-access playback operation may be any playback operation that is not "play," where the play operation plays back the media asset at normal playback speed.

In another example, a media guidance function may include presenting media guidance data. As referred to herein, the phrase, "media guidance data" or "guidance data" should be understood to mean any data related to content, such as media listings, media-related information (e.g., broadcast times, broadcast channels, titles, descriptions, ratings information (e.g., parental control ratings, critic's ratings, etc.), genre or category information, actor information, logo data for broadcasters' or providers' logos, etc.), media format (e.g., standard definition, high definition, 3D, etc.), advertisement information (e.g., text, images, media clips, etc.), on-demand information, blogs, websites, and any other type of guidance data that is helpful for a user to navigate among and locate desired content selections.

In some embodiments, the media guidance application then selects the media guidance function from the plurality of media guidance functions and performs the media guidance function in response to the user input. For example, a single user input may trigger various media guidance functions depending on how a user contacts a user input interface when making the user input. For example, the media guidance application may determine the tactile attributes associated with the contact and select a particular media guidance function associated with the particular tactile attributes and the particular user input.

In some embodiments, each of the plurality of media guidance functions is associated with a different fast-access playback operation. For example, a first fast-access playback operation may be a rewind operation, a second fast-access playback operation may be a skip-to-previous-chapter operation, and a third fast-access playback operation may be associated with a start over operation. Depending on the tactile attributes associated with the user input (e.g., the amount of pressure applied by a user during the user input, the length of time a user contacts the user input interface when making the user input, etc.) the media guidance application may determine whether to rewind a media asset (e.g., if low pressure is applied for a short period of time), skip to a previous chapter (e.g., if high pressure is applied for a short period of time), or start over the media asset (e.g., if high pressure is applied for a long period of time).

In addition to media guidance functions being associated with different operations (e.g., fast-access playback operations), the media guidance functions may be associated with different levels of operations. For example, in some embodiments, each of the plurality of media guidance functions is associated with a different fast-access playback operation speed. For example, a first fast-access playback operation speed may be a two frame skip fast-forward speed and a second fast-access playback operation speed may be a four frame skip fast-forward speed. Depending on the amount of pressure applied by a user during the user input, the media guidance application determines whether to fast-forward at a two frame skip speed (e.g., if less pressure is applied) or fast-forward at a four frame skip speed (e.g., if more pressure is applied).

In some embodiments, the media guidance application may even alter selected media guidance functions based on the tactile attributes of a user input while a media guidance function is being performed. For example, in response to a user applying low pressure during a user input, the media guidance application may perform a fast-forward at a two frame skip speed. While the media guidance application is performing the fast-forward at a two frame skip speed, the media guidance application may determine that the user has applied more pressure during the same user input (e.g., the user may have continued to apply pressure while the fast-forward was performed, then gradually applied more pressure). In response to the increase in pressure applied by the user, the media guidance application may adjust the media guidance function being performed. For example, the media guidance application may automatically perform a fast-forward at a four frame skip speed.

In some embodiments, the media guidance functions relate not only to operations (e.g., fast-access playback operations), but also to what features and/or content is presented by the media guidance application. For example, a media guidance function may relate to the selection of a media listing, change of channel, generation of a PIP window, presentation of subtitles, ordering of a pay-per-view movie, adjustment of a presentation volume, modification of user device display properties, etc.

For example, in some embodiments, a first media guidance function of the plurality of media guidance functions may relate to replacing current content with new content on a display device, and a second media guidance function of the plurality of media guidance functions may relate to presenting the new content simultaneously with the current content on the display device. For example, depending on the amount of pressure applied by a user during the user input, the media guidance application determines whether to present the new content in a PIP window overlaid on the current content (e.g., if less pressure is applied) or replace current content with new content (e.g., if more pressure is applied).

For example, while viewing a first program a user may wish to obtain a preview of another program. The user may enter a user input (e.g., a specific channel number, selection of the program via a menu, channel up command, etc.) associated with the presentation of the other program. Based on the tactile attributes (e.g., the amount of pressure applied to the user input interface when entering the user input), the media guidance application may generate a display of a preview of the other program in a PIP window before replacing the current program with the other program.

For example, the media guidance application may determine that a user is applying low pressure to a user input associated with a channel change request (e.g., causing a button associated with the user input to partially depress). In response, the media guidance application may generate a display of a preview, information, etc. of the channel associated with the channel change request. For example, the media guidance application may generate a PIP window featuring the channel associated with the channel change request while the current channel continues to be displayed. In another example, the media guidance application may generate a display of program schedule information, a textual description, critical reviews, a short preview clip, and/or any other media guidance data associated with the channel associated with the channel change request.

Alternatively, or subsequently to, determining that a user is applying low pressure to a user input associated with a channel change request (e.g., causing a button associated with the user input to partially depress), the media guidance application may determine that a user is applying high pressure to a user input associated with a channel change request (e.g., causing a button associated with the user input to fully depress). In response, the media guidance application may generate a display of different content (e.g., of the content and media guidance data discussed above) than that associated with the user applying low pressure. For example, in response to determining the user is applying high pressure the media guidance application may replace the content of a current channel with the content of the channel associated with the channel change request.

For example, the media guidance application may receive a user input and determine an amount of pressure applied by a user associated with the user input (e.g., requesting a channel change request). The media guidance application then cross-references the amount of pressure applied by the user with a database listing a plurality of media guidance functions, each associated with a different amount of pressure, to determine a media guidance function associated with the amount of pressure applied by the user (e.g., whether to change the current channel, generate a PIP window of the channel associated with the channel change request, or another media guidance function). The media guidance application then selects the media guidance function from the plurality of media guidance functions and performs the media guidance function in response to the user input.

In some embodiments, the media guidance application may determine the tactile attributes of multiple user inputs associated with a single user request. For example, a user may enter multiple inputs (e.g., corresponding to the numbers three, two, and five) when entering a single channel request (e.g., for the channel three hundred twenty-five). In another example, a user may enter each alpha-numeric character of the tile of a media asset when searching for a media listing associated with the media asset. In such cases, the media guidance application may determine the tactile attributes of each user input corresponding to the single user request or may determine the tactile attributes of only a single input of the multiple input user request (e.g., the last input of the multiple input user request).

Additionally or alternatively, the media guidance may generate a composite quantification of the tactile attributes associated with each user input of the multiple input user inputs in a single user request (e.g., each input associated with a single alpha-numeric character in a search string), with quantifications (e.g., indicating the pressure applied by a user during each user input), corresponding to one, one, two, and four, respectively, the media guidance application may determine that the composite quantification of the tactile attributes corresponds to two. It should be noted that the arithmetic mean or average referred to herein is but one way to determine a composite engagement level. Mathematical modes, medians, or other types of central or typical values may also be used.

To generate the composite quantification of the tactile attributes, the media guidance application may weigh each of the user inputs of the multiple user inputs according to one or more criteria. In some embodiments, such criteria may include the position of the user input in the multiple input user request. For example, the first or last user input may be weighed more heavily than a second or second-to-last user input. Another criterion may be the average tactile attribute associated with a particular user input. For example, if a particular user input, or an amount of a particular tactile attribute, is typically associated with a particular tactile attribute (e.g., as determined by comparing previous entries of the particular user input stored in a user profile or the previous entries of the particular user inputs of other users retrieved from a remote source), the media guidance application may compare the current tactile attribute associated with the current entry of the user input to previous (or average) tactile attributes associated with previous entry of the user input.

In such cases the comparison may be based on the subject matter, the user input interface, the type of user input interface, and/or the type of subject matter associated with the user input. For example, if the user input is a touch-screen, swipe, of the alpha-numeric character "five" for a channel selection of the channel number "thirty-five," the media guidance may compare the user input to one or more of previous inputs of a user(s) associated with touch-screen inputs, swipe inputs, inputs of the alpha-numeric character, inputs of the alpha-numeric character "five," inputs of second or last inputs in a multiple input user request, and/or inputs of a channel selection of the channel number "thirty-five."

It should be noted that any technique associated with determining a composite quantification for a user request featuring multiple user inputs may also be applied to user requests with a single user input. For example, if the user input is a touch-screen, swipe, of the alpha-numeric character "five" for a channel selection of the channel "five." The media guidance may compare the user input to one or more of previous inputs of a user(s) associated with touch-screen inputs, swipe inputs, inputs of the alpha-numeric character, inputs of the alpha-numeric character "five," inputs of single input user requests, and/or inputs of a channel selection of channel number "five."

In some embodiments, each of the plurality of media guidance functions may be associated with a different channel scan speed. For example, depending on the amount of pressure applied by a user during the user input, the media guidance application determines whether to scan channels at a rate of one channel every two seconds (e.g., if less pressure is applied) or scan channels at a rate of one channel every second (e.g., if more pressure is applied).

In some embodiments, each of the plurality of media guidance functions is associated with a different number of user devices affected by the media guidance function. For example, depending on the amount of pressure applied by a user during the user input, the media guidance application determines whether to apply the media guidance function to a single device (e.g., if less pressure is applied) or apply the media guidance function to several devices within a certain proximity (e.g., if more pressure is applied).

For example, the media guidance application may determine that a user is applying low pressure to a user input associated with a media guidance function (e.g., turn a user device on or off). In response, the media guidance application may turn a single device on or off. Alternatively, or subsequently to, determining that a user is applying low pressure to a user input associated with a media guidance function, the media guidance application may determining that a user is applying high pressure to the user input associated with the media guidance function. In response, the media guidance application may turn on or off all user devices associated with the user input interface, all user devices within a certain proximity to the user input interface, all user devices associated with the user, all user device associated with a network or household, etc. Additionally or alternatively, the media guidance application may apply the media guidance function to incremental groups (e.g., all user devices in a first proximity, then all user devices in a second proximity, etc.).

For example, in some embodiments, the media guidance application may receive tactile attributes associated with one or more user inputs. The media guidance application may cross-references those tactile attributes with a database that lists particular media guidance functions that correspond to a user input with the receive tactile attributes. Furthermore, the database may indicate one or more devices that corresponds (e.g., should perform the media guidance function) based on the received tactile attributes and/or particular user input. In response to determining the one or more devices that correspond to the received tactile attributes and/or particular user input, the media guidance application performs the media guidance function on the determined one or more devices.

As referred to herein, the phrase "user equipment device," "user equipment," "user device," "electronic device," "electronic equipment," "media equipment device," or "media device" should be understood to mean any device for accessing the content described above, such as a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a hand-held computer, a stationary telephone, a personal digital assistant (PDA), a mobile telephone, a portable video player, a portable music player, a portable gaming machine, a smart phone, or any other television equipment, computing equipment, or wireless device, and/or combination of the same. In some embodiments, the user equipment device may have a front facing screen and a rear facing screen, multiple front screens, or multiple angled screens.

In some embodiments, the user equipment device may have a front facing camera and/or a rear facing camera. On these user equipment devices, users may be able to navigate among and locate the same content available through a television. Consequently, media guidance may be available on these devices, as well. The guidance provided may be for content available only through a television, for content available only through one or more of other types of user equipment devices, or for content available both through a television and one or more of the other types of user equipment devices. The media guidance applications may be provided as on-line applications (i.e., provided on a website), or as stand-alone applications or clients on user equipment devices. Various devices and platforms that may implement media guidance applications are described in more detail below.

Figure 2:
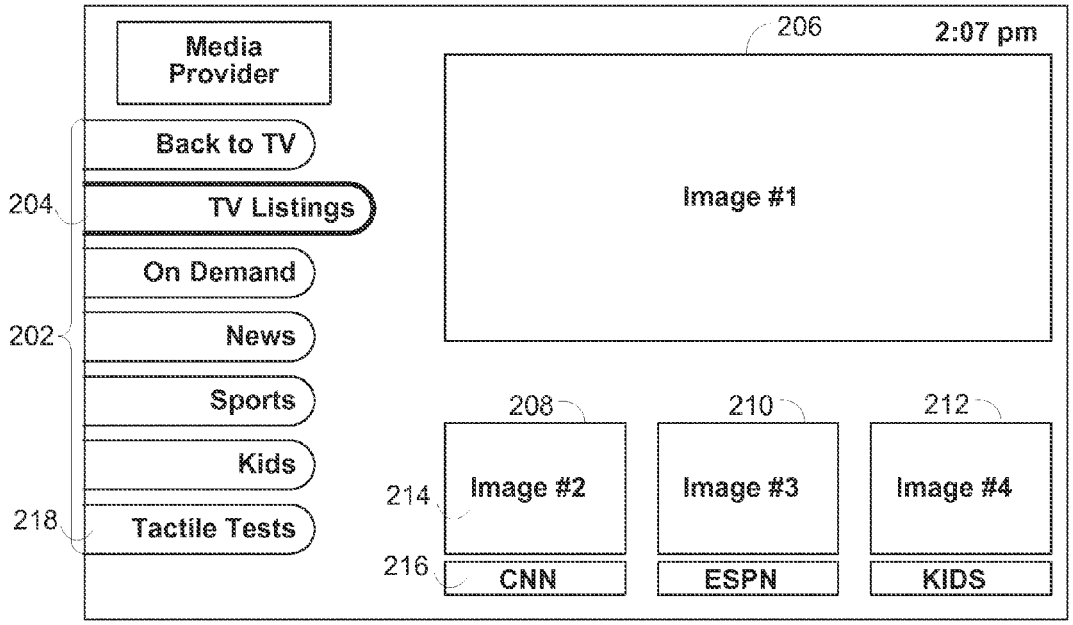
FIG. 2 shows another illustrative example of a media guidance display for navigating and selecting media assets in accordance with some embodiments of the disclosure.

FIGS. 1-2 show illustrative display screens that may be used to provide media guidance data. The display screens shown in FIGS. 1-2 may be implemented on any suitable user equipment device or platform. While the displays of FIGS. 1-2 are illustrated as full screen displays, they may also be fully or partially overlaid over content being displayed. A user may indicate a desire to access content information by selecting a selectable option provided in a display screen (e.g., a menu option, a listings option, an icon, a hyperlink, etc.) or pressing a dedicated button (e.g., a GUIDE button) on a remote control or other user input interface or device. In response to the user's indication, the media guidance application may provide a display screen with media guidance data organized in one of several ways, such as by time and channel in a grid, by time, by channel, by source, by content type, by category (e.g., movies, sports, news, children, or other categories of programming), or other predefined, user-defined, or other organization criteria. The organization of the media guidance data is determined by guidance application data. As referred to herein, the phrase, "guidance application data" should be understood to mean data used in operating the guidance application, such as program information, guidance application settings, user preferences, or user profile information.

FIG. 1 shows illustrative grid program listings display 100 arranged by time and channel that also enables access to different types of content in a single display. Display 100 may include grid 102 with: (1) a column of channel/content type identifiers 104, where each channel/content type identifier (which is a cell in the column) identifies a different channel or content type available; and (2) a row of time identifiers 106, where each time identifier (which is a cell in the row) identifies a time block of programming. Grid 102 also includes cells of program listings, such as program listing 108, where each listing provides the title of the program provided on the listing's associated channel and time. With a user input device, a user can select program listings by moving highlight region 110. Information relating to the program listing selected by highlight region 110 may be provided in program information region 112. Region 112 may include, for example, the program title, the program description, the time the program is provided (if applicable), the channel the program is on (if applicable), the program's rating, and other desired information.

In addition to providing access to linear programming (e.g., content that is scheduled to be transmitted to a plurality of user equipment devices at a predetermined time and is provided according to a schedule), the media guidance application also provides access to non-linear programming (e.g., content accessible to a user equipment device at any time and is not provided according to a schedule). Non-linear programming may include content from different content sources including on-demand content (e.g., VOD), Internet content (e.g., streaming media, downloadable media, etc.), locally stored content (e.g., content stored on any user equipment device described above or other storage device), or other time-independent content. On-demand content may include movies or any other content provided by a particular content provider (e.g., HBO On Demand providing "The Sopranos" and "Curb Your Enthusiasm"). HBO ON DEMAND is a service mark owned by Time Warner Company L.P. et al. and THE SOPRANOS and CURB YOUR ENTHUSIASM are trademarks owned by the Home Box Office, Inc. Internet content may include web events, such as a chat session or Webcast, or content available on-demand as streaming content or downloadable content through an Internet web site or other Internet access (e.g. FTP).

Grid 102 may provide media guidance data for non-linear programming including on-demand listing 114, recorded content listing 116, and Internet content listing 118. A display combining media guidance data for content from different types of content sources is sometimes referred to as a "mixed-media" display. Various permutations of the types of media guidance data that may be displayed that are different than display 100 may be based on user selection or guidance application definition (e.g., a display of only recorded and broadcast listings, only on-demand and broadcast listings, etc.). As illustrated, listings 114, 116, and 118 are shown as spanning the entire time block displayed in grid 102 to indicate that selection of these listings may provide access to a display dedicated to on-demand listings, recorded listings, or Internet listings, respectively. In some embodiments, listings for these content types may be included directly in grid 102. Additional media guidance data may be displayed in response to the user selecting one of the navigational icons 120. (Pressing an arrow key on a user input device may affect the display in a similar manner as selecting navigational icons 120.)

Display 100 may also include video region 122, advertisement 124, and options region 126. Video region 122 may allow the user to view and/or preview programs that are currently available, will be available, or were available to the user. The content of video region 122 may correspond to, or be independent from, one of the listings displayed in grid 102. Grid displays including a video region are sometimes referred to as picture-in-guide (PIG) displays. PIG displays and their functionalities are described in greater detail in Satterfield et al. U.S. Pat. No. 6,564,378, issued May 13, 2003 and Yuen et al. U.S. Pat. No. 6,239,794, issued May 29, 2001, which are hereby incorporated by reference herein in their entireties. PIG displays may be included in other media guidance application display screens of the embodiments described herein.

Advertisement 124 may provide an advertisement for content that, depending on a viewer's access rights (e.g., for subscription programming), is currently available for viewing, will be available for viewing in the future, or may never become available for viewing, and may correspond to or be unrelated to one or more of the content listings in grid 102. Advertisement 124 may also be for products or services related or unrelated to the content displayed in grid 102. Advertisement 124 may be selectable and provide further information about content, provide information about a product or a service, enable purchasing of content, a product, or a service, provide content relating to the advertisement, etc. Advertisement 124 may be targeted based on a user's profile/preferences, monitored user activity, the type of display provided, or on other suitable targeted advertisement bases.

While advertisement 124 is shown as rectangular or banner shaped, advertisements may be provided in any suitable size, shape, and location in a guidance application display. For example, advertisement 124 may be provided as a rectangular shape that is horizontally adjacent to grid 102. This is sometimes referred to as a panel advertisement. In addition, advertisements may be overlaid over content or a guidance application display or embedded within a display. Advertisements may also include text, images, rotating images, video clips, or other types of content described above. Advertisements may be stored in a user equipment device having a guidance application, in a database connected to the user equipment, in a remote location (including streaming media servers), or on other storage means, or a combination of these locations. Providing advertisements in a media guidance application is discussed in greater detail in, for example, Knudson et al., U.S. Patent Application Publication No. 2003/0110499, filed Jan. 17, 2003; Ward, III et al. U.S. Pat. No. 6,756,997, issued Jun. 29, 2004; and Schein et al. U.S. Pat. No. 6,388,714, issued May 14, 2002, which are hereby incorporated by reference herein in their entireties. It will be appreciated that advertisements may be included in other media guidance application display screens of the embodiments described herein.

Options region 126 may allow the user to access different types of content, media guidance application displays, and/or media guidance application features. Options region 126 may be part of display 100 (and other display screens described herein), or may be invoked by a user by selecting an on-screen option or pressing a dedicated or assignable button on a user input device. The selectable options within options region 126 may concern features related to program listings in grid 102 or may include options available from a main menu display. Features related to program listings may include searching for other air times or ways of receiving a program, recording a program, enabling series recording of a program, setting program and/or channel as a favorite, purchasing a program, or other features. Options available from a main menu display may include search options, VOD options, parental control options, Internet options, cloud-based options, device synchronization options, second screen device options, options to access various types of media guidance data displays, options to subscribe to a premium service, options to edit a user's profile, options to access a browse overlay, or other options.

The media guidance application may be personalized based on a user's preferences. A personalized media guidance application allows a user to customize displays and features to create a personalized "experience" with the media guidance application. This personalized experience may be created by allowing a user to input these customizations and/or by the media guidance application monitoring user activity to determine various user preferences. Users may access their personalized guidance application by logging in or otherwise identifying themselves to the guidance application. Customization of the media guidance application may be made in accordance with a user profile. The customizations may include varying presentation schemes (e.g., color scheme of displays, font size of text, etc.), aspects of content listings displayed (e.g., only HDTV or only 3D programming, user-specified broadcast channels based on favorite channel selections, re-ordering the display of channels, recommended content, etc.), desired recording features (e.g., recording or series recordings for particular users, recording quality, etc.), parental control settings, customized presentation of Internet content (e.g., presentation of social media content, e-mail, electronically delivered articles, etc.) and other desired customizations.

The media guidance application may allow a user to provide user profile information or may automatically compile user profile information. The media guidance application may, for example, monitor the content the user accesses and/or other interactions the user may have with the guidance application. Additionally, the media guidance application may obtain all or part of other user profiles that are related to a particular user (e.g., from other web sites on the Internet the user accesses, such as www.allrovi.com, from other media guidance applications the user accesses, from other interactive applications the user accesses, from another user equipment device of the user, etc.), and/or obtain information about the user from other sources that the media guidance application may access. As a result, a user can be provided with a unified guidance application experience across the user's different user equipment devices. This type of user experience is described in greater detail below in connection with FIG. 4. Additional personalized media guidance application features are described in greater detail in Ellis et al., U.S. Patent Application Publication No. 2005/0251827, filed Jul. 11, 2005, Boyer et al., U.S. Pat. No. 7,165,098, issued Jan. 16, 2007, and Ellis et al., U.S. Patent Application Publication No. 2002/0174430, filed Feb. 21, 2002, which are hereby incorporated by reference herein in their entireties.

Another display arrangement for providing media guidance is shown in FIG. 2. Video mosaic display 200 includes selectable options 202 for content information organized based on content type, genre, and/or other organization criteria. In display 200, television listings option 204 is selected, thus providing listings 206, 208, 210, and 212 as broadcast program listings. In display 200 the listings may provide graphical images including cover art, still images from the content, video clip previews, live video from the content, or other types of content that indicate to a user the content being described by the media guidance data in the listing. Each of the graphical listings may also be accompanied by text to provide further information about the content associated with the listing. For example, listing 208 may include more than one portion, including media portion 214 and text portion 216. Media portion 214 and/or text portion 216 may be selectable to view content in full-screen or to view information related to the content displayed in media portion 214 (e.g., to view listings for the channel that the video is displayed on).

The listings in display 200 are of different sizes (i.e., listing 206 is larger than listings 208, 210, and 212), but if desired, all the listings may be the same size. Listings may be of different sizes or graphically accentuated to indicate degrees of interest to the user or to emphasize certain content, as desired by the content provider or based on user preferences. Various systems and methods for graphically accentuating content listings are discussed in, for example, Yates, U.S. Patent Application Publication No. 2010/0153885, filed Dec. 29, 2005, which is hereby incorporated by reference herein in its entirety.

Figure 3:
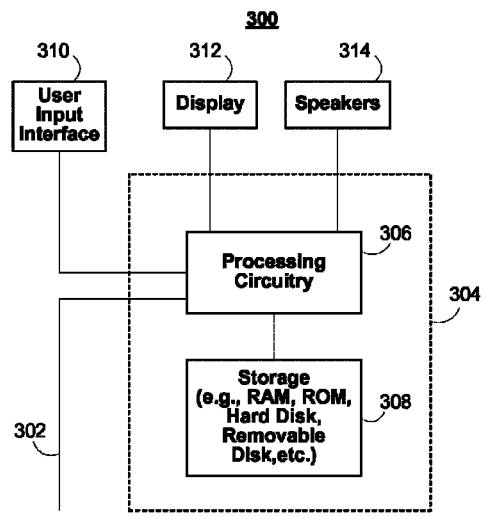
FIG. 3 is a block diagram of an illustrative user equipment device in accordance with some embodiments of the disclosure.

Users may access content and the media guidance application (and its display screens described above and below) from one or more of their user equipment devices. FIG. 3 shows a generalized embodiment of illustrative user equipment device 300. More specific implementations of user equipment devices are discussed below in connection with FIG. 4. User equipment device 300 may receive content and data via input/output (hereinafter "I/O") path 302. I/O path 302 may provide content (e.g., broadcast programming, on-demand programming, Internet content, content available over a local area network (LAN) or wide area network (WAN), and/or other content) and data to control circuitry 304, which includes processing circuitry 306 and storage 308. Control circuitry 304 may be used to send and receive commands, requests, and other suitable data using I/O path 302. I/O path 302 may connect control circuitry 304 (and specifically processing circuitry 306) to one or more communications paths (described below). I/O functions may be provided by one or more of these communications paths, but are shown as a single path in FIG. 3 to avoid overcomplicating the drawing.

Control circuitry 304 may be based on any suitable processing circuitry such as processing circuitry 306. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 304 executes instructions for a media guidance application stored in memory (i.e., storage 308). Specifically, control circuitry 304 may be instructed by the media guidance application to perform the functions discussed above and below. For example, the media guidance application may provide instructions to control circuitry 304 to generate the media guidance displays. In some implementations, any action performed by control circuitry 304 may be based on instructions received from the media guidance application.

In client-server based embodiments, control circuitry 304 may include communications circuitry suitable for communicating with a guidance application server or other networks or servers. The instructions for carrying out the above mentioned functionality may be stored on the guidance application server. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communications networks or paths (which is described in more detail in connection with FIG. 4). In addition, communications circuitry may include circuitry that enables peer-to-peer communication of user equipment devices, or communication of user equipment devices in locations remote from each other (described in more detail below).

Memory may be an electronic storage device provided as storage 308 that is part of control circuitry 304. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 308 may be used to store various types of content described herein as well as media guidance information, described above, and guidance application data, described above. Nonvolatile memory may also be used (e.g., to launch a boot-up routine and other instructions). Cloud-based storage, described in relation to FIG. 4, may be used to supplement storage 308 or instead of storage 308.

Control circuitry 304 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 304 may also include scaler circuitry for upconverting and downconverting content into the preferred output format of the user equipment 300. Circuitry 304 may also include digital-to-analog converter circuitry and analog-to-digital converter circuitry for converting between digital and analog signals. The tuning and encoding circuitry may be used by the user equipment device to receive and to display, to play, or to record content. The tuning and encoding circuitry may also be used to receive guidance data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 308 is provided as a separate device from user equipment 300, the tuning and encoding circuitry (including multiple tuners) may be associated with storage 308.

A user may send instructions to control circuitry 304 using user input interface 310. User input interface 310 may be any suitable user interface, such as a remote control, mouse, trackball, keypad, keyboard, touch screen, touchpad, stylus input, joystick, voice recognition interface, or other user input interfaces. In addition to receiving user inputs, user input interface 310 may detect tactile attributes associated with a user input. For example, in some embodiments, in addition to receiving user instructions via the user input, the media guidance application may receive data (e.g., metadata associated with the user instructions) describing how the user input was received.

For example, user input interface 310 may include one or more components configured to detect tactile attributes, including, but not limited to, an amount of pressure applied by a user to a user input interface when making a user input, a length of time a user contacts and/or applies pressure to a user input interface in order to make a user input, a velocity at which a user touches a user input interface when making a user input, a frequency of contact between a user and a user input interface when making user inputs, how a user contacts a user input interface (e.g., by swiping, pinching, striking, rubbing, etc.) when making a user input, a direction a user contacts a user input interface (e.g., vertically, horizontally, left-to-right, right-to-left, diagonally, etc.), what a user uses to make contact with a user input interface when making a user input, and/or any other characteristic that describes the contact between a user and the user input interface when making a user input.

Methods and systems for detecting tactile attributes of user input entireties are described in greater detail in Day et al. U.S. Patent Publication No. 2010/0308844, published Dec. 9, 2010, Lee et al. U.S. Patent Publication No. 2012/0319937, published Dec. 20, 2012, and Dietz et al. U.S.

Patent Publication No. 2012/0293448, published Nov. 22, 2012, which are hereby incorporated by reference herein in their entireties.

Display 312 may be provided as a stand-alone device or integrated with other elements of user equipment device 300. Display 312 may be one or more of a monitor, a television, a liquid crystal display (LCD) for a mobile device, or any other suitable equipment for displaying visual images. In some embodiments, display 312 may be HDTV-capable. In some embodiments, display 312 may be a 3D display, and the interactive media guidance application and any suitable content may be displayed in 3D. A video card or graphics card may generate the output to the display 312. The video card may offer various functions such as accelerated rendering of 3D scenes and 2D graphics, MPEG-2/MPEG-4 decoding, TV output, or the ability to connect multiple monitors. The video card may be any processing circuitry described above in relation to control circuitry 304. The video card may be integrated with the control circuitry 304. Speakers 314 may be provided as integrated with other elements of user equipment device 300 or may be stand-alone units. The audio component of videos and other content displayed on display 312 may be played through speakers 314. In some embodiments, the audio may be distributed to a receiver (not shown), which processes and outputs the audio via speakers 314.

The guidance application may be implemented using any suitable architecture. For example, it may be a stand-alone application wholly implemented on user equipment device 300. In such an approach, instructions of the application are stored locally, and data for use by the application is downloaded on a periodic basis (e.g., from an out-of-band feed, from an Internet resource, or using another suitable approach). In some embodiments, the media guidance application is a client-server based application. Data for use by a thick or thin client implemented on user equipment device 300 is retrieved on-demand by issuing requests to a server remote to the user equipment device 300. In one example of a client-server based guidance application, control circuitry 304 runs a web browser that interprets web pages provided by a remote server.

In some embodiments, the media guidance application is downloaded and interpreted or otherwise run by an interpreter or virtual machine (run by control circuitry 304). In some embodiments, the guidance application may be encoded in the ETV Binary Interchange Format (EBIF), received by control circuitry 304 as part of a suitable feed, and interpreted by a user agent running on control circuitry 304. For example, the guidance application may be an EBIF application. In some embodiments, the guidance application may be defined by a series of JAVA-based files that are received and run by a local virtual machine or other suitable middleware executed by control circuitry 304. In some of such embodiments (e.g., those employing MPEG-2 or other digital media encoding schemes), the guidance application may be, for example, encoded and transmitted in an MPEG-2 object carousel with the MPEG audio and video packets of a program.

Figure 4:
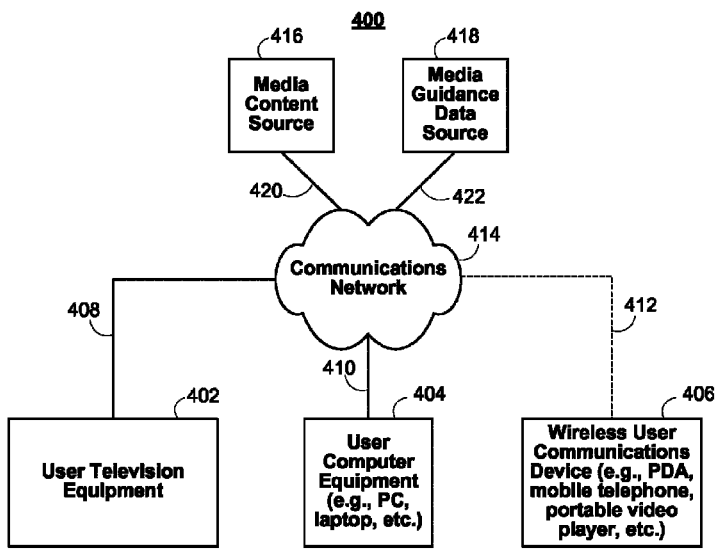
FIG. 4 is a block diagram of an illustrative media system in accordance with some embodiments of the disclosure.

User equipment device 300 of FIG. 3 can be implemented in system 400 of FIG. 4 as user television equipment 402, user computer equipment 404, wireless user communications device 406, or any other type of user equipment suitable for accessing content, such as a non-portable gaming machine. For simplicity, these devices may be referred to herein collectively as user equipment or user equipment devices, and may be substantially similar to user equipment devices described above. User equipment devices, on which a media guidance application may be implemented, may function as a standalone device or may be part of a network of devices. Various network configurations of devices may be implemented and are discussed in more detail below.

A user equipment device utilizing at least some of the system features described above in connection with FIG. 3 may not be classified solely as user television equipment 402, user computer equipment 404, or a wireless user communications device 406. For example, user television equipment 402 may, like some user computer equipment 404, be Internet-enabled allowing for access to Internet content, while user computer equipment 404 may, like some television equipment 402, include a tuner allowing for access to television programming. The media guidance application may have the same layout on various different types of user equipment or may be tailored to the display capabilities of the user equipment. For example, on user computer equipment 404, the guidance application may be provided as a web site accessed by a web browser. In another example, the guidance application may be scaled down for wireless user communications devices 406.

In system 400, there is typically more than one of each type of user equipment device but only one of each is shown in FIG. 4 to avoid overcomplicating the drawing. In addition, each user may utilize more than one type of user equipment device and also more than one of each type of user equipment device.

In some embodiments, a user equipment device (e.g., user television equipment 402, user computer equipment 404, wireless user communications device 406) may be referred to as a "second screen device." For example, a second screen device may supplement content presented on a first user equipment device. The content presented on the second screen device may be any suitable content that supplements the content presented on the first device. In some embodiments, the second screen device provides an interface for adjusting settings and display preferences of the first device. In some embodiments, the second screen device is configured for interacting with other second screen devices or for interacting with a social network. The second screen device can be located in the same room as the first device, a different room from the first device but in the same house or building, or in a different building from the first device.

The user may also set various settings to maintain consistent media guidance application settings across in-home devices and remote devices. Settings include those described herein, as well as channel and program favorites, programming preferences that the guidance application utilizes to make programming recommendations, display preferences, and other desirable guidance settings. For example, if a user sets a channel as a favorite on, for example, the web site www.allrovi.com on their personal computer at their office, the same channel would appear as a favorite on the user's in-home devices (e.g., user television equipment and user computer equipment) as well as the user's mobile devices, if desired. Therefore, changes made on one user equipment device can change the guidance experience on another user equipment device, regardless of whether they are the same or a different type of user equipment device. In addition, the changes made may be based on settings input by a user, as well as user activity monitored by the guidance application.

The user equipment devices may be coupled to communications network 414. Namely, user television equipment 402, user computer equipment 404, and wireless user communications device 406 are coupled to communications network 414 via communications paths 408, 410, and 412, respectively. Communications network 414 may be one or more networks including the Internet, a mobile phone network, mobile voice or data network (e.g., a 4G or LTE network), cable network, public switched telephone network, or other types of communications network or combinations of communications networks. Paths 408, 410, and 412 may separately or together include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. Path 412 is drawn with dotted lines to indicate that in the exemplary embodiment shown in FIG. 4 it is a wireless path and paths 408 and 410 are drawn as solid lines to indicate they are wired paths (although these paths may be wireless paths, if desired). Communications with the user equipment devices may be provided by one or more of these communications paths, but are shown as a single path in FIG. 4 to avoid overcomplicating the drawing.

Although communications paths are not drawn between user equipment devices, these devices may communicate directly with each other via communication paths, such as those described above in connection with paths 408, 410, and 412, as well as other short-range point-to-point communication paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC. The user equipment devices may also communicate with each other directly through an indirect path via communications network 414.

System 400 includes content source 416 and media guidance data source 418 coupled to communications network 414 via communication paths 420 and 422, respectively. Paths 420 and 422 may include any of the communication paths described above in connection with paths 408, 410, and 412. Communications with the content source 416 and media guidance data source 418 may be exchanged over one or more communications paths, but are shown as a single path in FIG. 4 to avoid overcomplicating the drawing. In addition, there may be more than one of each of content source 416 and media guidance data source 418, but only one of each is shown in FIG. 4 to avoid overcomplicating the drawing. (The different types of each of these sources are discussed below.) If desired, content source 416 and media guidance data source 418 may be integrated as one source device. Although communications between sources 416 and 418 with user equipment devices 402, 404, and 406 are shown as through communications network 414, in some embodiments, sources 416 and 418 may communicate directly with user equipment devices 402, 404, and 406 via communication paths (not shown) such as those described above in connection with paths 408, 410, and 412.

Content source 416 may include one or more types of content distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other content providers. NBC is a trademark owned by the National Broadcasting Company, Inc., ABC is a trademark owned by the American Broadcasting Company, Inc., and HBO is a trademark owned by the Home Box Office, Inc. Content source 416 may be the originator of content (e.g., a television broadcaster, a Webcast provider, etc.) or may not be the originator of content (e.g., an on-demand content provider, an Internet provider of content of broadcast programs for downloading, etc.). Content source 416 may include cable sources, satellite providers, on-demand providers, Internet providers, over-the-top content providers, or other providers of content. Content source 416 may also include a remote media server used to store different types of content (including video content selected by a user), in a location remote from any of the user equipment devices. Systems and methods for remote storage of content, and providing remotely stored content to user equipment are discussed in greater detail in connection with Ellis et al., U.S. Pat. No. 7,761,892, issued Jul. 20, 2010, which is hereby incorporated by reference herein in its entirety.

Media guidance data source 418 may provide media guidance data, such as the media guidance data described above. Media guidance application data may be provided to the user equipment devices using any suitable approach. In some embodiments, the guidance application may be a stand-alone interactive television program guide that receives program guide data via a data feed (e.g., a continuous feed or trickle feed). Program schedule data and other guidance data may be provided to the user equipment on a television channel sideband, using an in-band digital signal, using an out-of-band digital signal, or by any other suitable data transmission technique. Program schedule data and other media guidance data may be provided to user equipment on multiple analog or digital television channels.

In some embodiments, guidance data from media guidance data source 418 may be provided to users' equipment using a client-server approach. For example, a user equipment device may pull media guidance data from a server, or a server may push media guidance data to a user equipment device. In some embodiments, a guidance application client residing on the user's equipment may initiate sessions with source 418 to obtain guidance data when needed, e.g., when the guidance data is out of date or when the user equipment device receives a request from the user to receive data. Media guidance may be provided to the user equipment with any suitable frequency (e.g., continuously, daily, a user-specified period of time, a system-specified period of time, in response to a request from user equipment, etc.). Media guidance data source 418 may provide user equipment devices 402, 404, and 406 the media guidance application itself or software updates for the media guidance application.

Media guidance applications may be, for example, stand-alone applications implemented on user equipment devices. For example, the media guidance application may be implemented as software or a set of executable instructions which may be stored in storage 308, and executed by control circuitry 304 of a user equipment device 300. In some embodiments, media guidance applications may be client-server applications where only a client application resides on the user equipment device, and server application resides on a remote server. For example, media guidance applications may be implemented partially as a client application on control circuitry 304 of user equipment device 300 and partially on a remote server as a server application (e.g., media guidance data source 418) running on control circuitry of the remote server. When executed by control circuitry of the remote server (such as media guidance data source 418), the media guidance application may instruct the control circuitry to generate the guidance application displays and transmit the generated displays to the user equipment devices. The server application may instruct the control circuitry of the media guidance data source 418 to transmit data for storage on the user equipment. The client application may instruct control circuitry of the receiving user equipment to generate the guidance application displays.

Content and/or media guidance data delivered to user equipment devices 402, 404, and 406 may be over-the-top (OTT) content. OTT content delivery allows Internet-enabled user devices, including any user equipment device described above, to receive content that is transferred over the Internet, including any content described above, in addition to content received over cable or satellite connections. OTT content is delivered via an Internet connection provided by an Internet service provider (ISP), but a third party distributes the content. The ISP may not be responsible for the viewing abilities, copyrights, or redistribution of the content, and may only transfer IP packets provided by the OTT content provider. Examples of OTT content providers include YOUTUBE, NETFLIX, and HULU, which provide audio and video via IP packets. Youtube is a trademark owned by Google Inc., Netflix is a trademark owned by Netflix Inc., and Hulu is a trademark owned by Hulu, LLC. OTT content providers may additionally or alternatively provide media guidance data described above. In addition to content and/or media guidance data, providers of OTT content can distribute media guidance applications (e.g., web-based applications or cloud-based applications), or the content can be displayed by media guidance applications stored on the user equipment device.

Media guidance system 400 is intended to illustrate a number of approaches, or network configurations, by which user equipment devices and sources of content and guidance data may communicate with each other for the purpose of accessing content and providing media guidance. The embodiments described herein may be applied in any one or a subset of these approaches, or in a system employing other approaches for delivering content and providing media guidance. The following four approaches provide specific illustrations of the generalized example of FIG. 4.

In one approach, user equipment devices may communicate with each other within a home network. User equipment devices can communicate with each other directly via short-range point-to-point communication schemes described above, via indirect paths through a hub or other similar device provided on a home network, or via communications network 414. Each of the multiple individuals in a single home may operate different user equipment devices on the home network. As a result, it may be desirable for various media guidance information or settings to be communicated between the different user equipment devices. For example, it may be desirable for users to maintain consistent media guidance application settings on different user equipment devices within a home network, as described in greater detail in Ellis et al., U.S. patent application Ser. No. 11/179,410, filed Jul. 11, 2005. Different types of user equipment devices in a home network may also communicate with each other to transmit content. For example, a user may transmit content from user computer equipment to a portable video player or portable music player.

In a second approach, users may have multiple types of user equipment by which they access content and obtain media guidance. For example, some users may have home networks that are accessed by in-home and mobile devices. Users may control in-home devices via a media guidance application implemented on a remote device. For example, users may access an online media guidance application on a website via a personal computer at their office, or a mobile device such as a PDA or web-enabled mobile telephone. The user may set various settings (e.g., recordings, reminders, or other settings) on the online guidance application to control the user's in-home equipment. The online guide may control the user's equipment directly, or by communicating with a media guidance application on the user's in-home equipment. Various systems and methods for user equipment devices communicating, where the user equipment devices are in locations remote from each other, is discussed in, for example, Ellis et al., U.S. Pat. No. 8,046,801, issued Oct. 25, 2011, which is hereby incorporated by reference herein in its entirety.

In a third approach, users of user equipment devices inside and outside a home can use their media guidance application to communicate directly with content source 416 to access content. Specifically, within a home, users of user television equipment 402 and user computer equipment 404 may access the media guidance application to navigate among and locate desirable content. Users may also access the media guidance application outside of the home using wireless user communications devices 406 to navigate among and locate desirable content.

In a fourth approach, user equipment devices may operate in a cloud computing environment to access cloud services. In a cloud computing environment, various types of computing services for content sharing, storage or distribution (e.g., video sharing sites or social networking sites) are provided by a collection of network-accessible computing and storage resources, referred to as "the cloud." For example, the cloud can include a collection of server computing devices, which may be located centrally or at distributed locations, that provide cloud-based services to various types of users and devices connected via a network such as the Internet via communications network 414. These cloud resources may include one or more content sources 416 and one or more media guidance data sources 418. In addition or in the alternative, the remote computing sites may include other user equipment devices, such as user television equipment 402, user computer equipment 404, and wireless user communications device 406. For example, the other user equipment devices may provide access to a stored copy of a video or a streamed video. In such embodiments, user equipment devices may operate in a peer-to-peer manner without communicating with a central server.

The cloud provides access to services, such as content storage, content sharing, or social networking services, among other examples, as well as access to any content described above, for user equipment devices. Services can be provided in the cloud through cloud computing service providers, or through other providers of online services. For example, the cloud-based services can include a content storage service, a content sharing site, a social networking site, or other services via which user-sourced content is distributed for viewing by others on connected devices. These cloud-based services may allow a user equipment device to store content to the cloud and to receive content from the cloud rather than storing content locally and accessing locally-stored content.

A user may use various content capture devices, such as camcorders, digital cameras with video mode, audio recorders, mobile phones, and handheld computing devices, to record content. The user can upload content to a content storage service on the cloud either directly, for example, from user computer equipment 404 or wireless user communications device 406 having content capture feature. Alternatively, the user can first transfer the content to a user equipment device, such as user computer equipment 404. The user equipment device storing the content uploads the content to the cloud using a data transmission service on communications network 414. In some embodiments, the user equipment device itself is a cloud resource, and other user equipment devices can access the content directly from the user equipment device on which the user stored the content.

Cloud resources may be accessed by a user equipment device using, for example, a web browser, a media guidance application, a desktop application, a mobile application, and/or any combination of access applications of the same. The user equipment device may be a cloud client that relies on cloud computing for application delivery, or the user equipment device may have some functionality without access to cloud resources. For example, some applications running on the user equipment device may be cloud applications, i.e., applications delivered as a service over the Internet, while other applications may be stored and run on the user equipment device. In some embodiments, a user device may receive content from multiple cloud resources simultaneously. For example, a user device can stream audio from one cloud resource while downloading content from a second cloud resource. Or a user device can download content from multiple cloud resources for more efficient downloading. In some embodiments, user equipment devices can use cloud resources for processing operations such as the processing operations performed by processing circuitry described in relation to FIG. 3.

Figure 5:
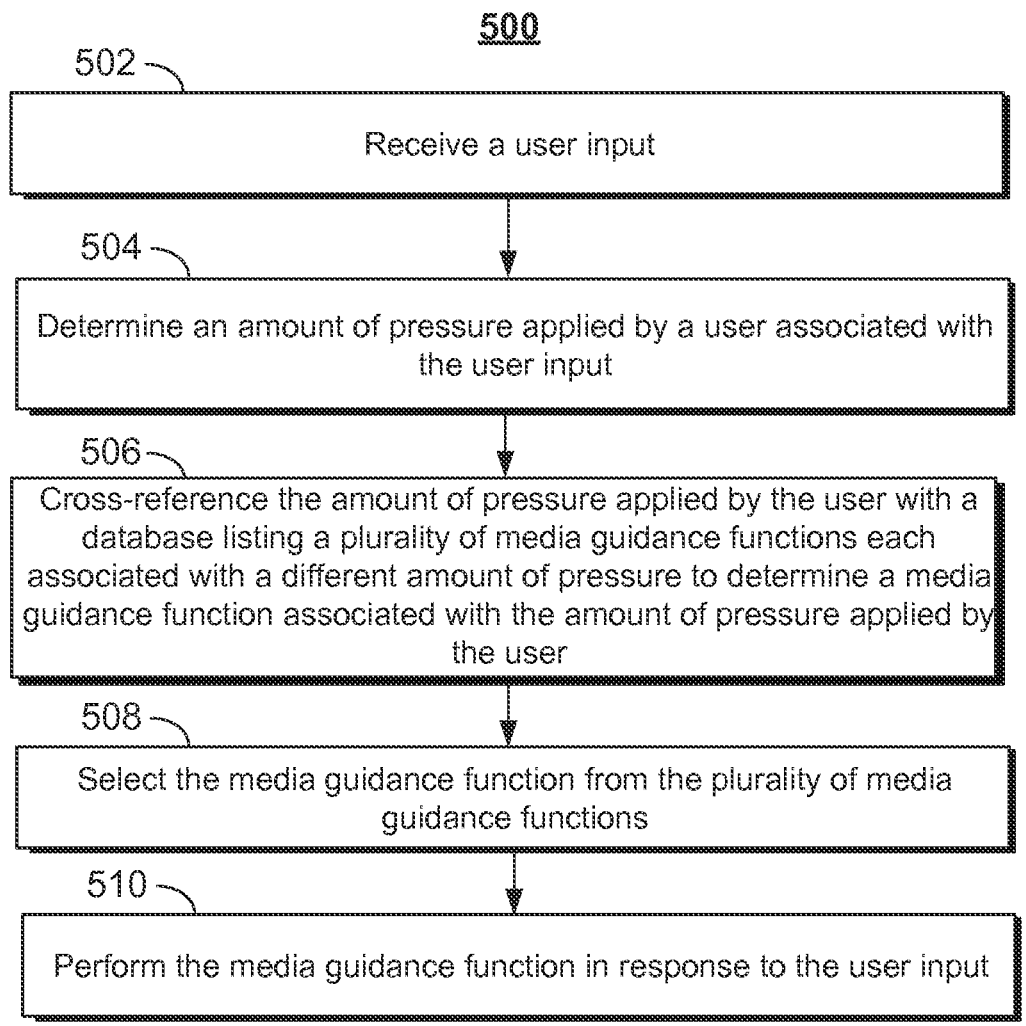
FIG. 5 is a flowchart of illustrative steps for selecting a media guidance function from a plurality of media guidance functions based on an amount of pressure applied by a user during a user input in accordance with some embodiments of the disclosure.

FIG. 5 is a flowchart of illustrative steps for selecting a media guidance function from a plurality of media guidance functions based on an amount of pressure applied by a user during a user input. It should be noted that process 500 or any step thereof could be performed on, or provided by, any of the devices shown in FIGS. 3-4. For example, process 500 may be executed by control circuitry 304 (FIG. 3) as instructed by a media guidance application implemented on user equipment 402, 404, and/or 406 (FIG. 4) in order to select a media guidance function from a plurality of media guidance functions based on an amount of pressure applied by a user during a user input. In addition, one or more steps of process 500 may be incorporated into or combined with one or more steps of any other process or embodiment (e.g., process 600 (FIG. 6)).

At step 502, the media guidance application receives a user input. For example, the media guidance application may receive (e.g., via user input interface 310 (FIG. 3)) a user request (e.g., associated with one or more user inputs) to perform a media guidance function. In some embodiments, the media guidance application may receive the user input and determine (e.g., via control circuitry 304 (FIG. 3)) one or more media guidance functions associated with the particular user input. To select a particular media guidance function to perform from the one or more media guidance functions, the media guidance application may detect (e.g., via a component incorporated into or accessible by user input interface 310 (FIG. 3)) and analyze (e.g., via control circuitry 304 (FIG. 3)) tactile attributes associated with the user input.

At step 504, the media guidance application determines an amount of pressure applied by a user associated with the user input. For example, the media guidance application may receive data (e.g., from a component incorporated into or accessible by user input interface 310 (FIG. 3)) that indicates the amount of pressure a user applied when entering the user input. In some embodiments, the media guidance application (e.g., via control circuitry 304 (FIG. 3)) may quantify the tactile attributes according to a respective metrics. For example, when determining the amount of pressure that was applied by a user during a user input, the media guidance application may measure the pressure in grams per meter and/or any other suitable unit of measure. In another example, when determining the length of time a user applied pressure during a user input, the media guidance application may measure the length of time in seconds and/or any other suitable unit of measure.

At step 506, the media guidance application cross-references the amount of pressure applied by the user with a database listing a plurality of media guidance functions each associated with a different amount of pressure to determine a media guidance function associated with the amount of pressure applied by the user. For example, after quantifying (determining a finite value based on a particular measurement standard) a tactile attribute associated with a user input, the media guidance application may input (e.g., via control circuitry 304 (FIG. 3)) the quantified tactile attribute in a database (e.g., stored locally at storage 308 (FIG. 3) or remotely at any location accessible via communications network 414 (FIG. 4)).

For example, the database may be structured as a lookup table and the media guidance application may filter the listings (e.g., available media guidance functions) in the database based on criteria (e.g., a particular user input entered and/or one or more tactile attributes associated with the user input) to determine only a single listing (e.g., a media guidance function) associated with the user input. The database may then output the listing for receipt by the media guidance application.

At step 508, the media guidance application selects the media guidance function from the plurality of media guidance functions. For example, the media guidance application may receive (e.g., via I/O path 302 (FIG. 3) or directly from storage 308 (FIG. 3)) a listing from a database associated with tactile attributes associated with media guidance functions. The listing, corresponding to a media guidance function, may then be selected (e.g., via control circuitry 304 (FIG. 3)) by the media guidance application.

At step 510, the media guidance application performs the media guidance function in response to the user input. For example, in response to determining (e.g., via control circuitry 304 (FIG. 3)) that the user input and/or tactile attributes (e.g., the amount of pressure applied by the user during the user input) indicates the user wishes to perform a particular media guidance function, the media guidance application (e.g., via control circuitry 304 (FIG. 3)) performs the function (e.g., associated with the presentation of media guidance application, performance of one or more fast-access playback operations, generation for display of one or more media assets, etc.).

It is contemplated that the steps or descriptions of FIG. 5 may be used with any other embodiment of this disclosure. In addition, the steps and descriptions described in relation to FIG. 5 may be done in alternative orders or in parallel to further the purposes of this disclosure. For example, each of these steps may be performed in any order or in parallel or substantially simultaneously to reduce lag or increase the speed of the system or method. Furthermore, it should be noted that any of the devices or equipment discussed in relation to FIGS. 3-4 could be used to perform one of more of the steps in FIG. 5.

Figure 6:
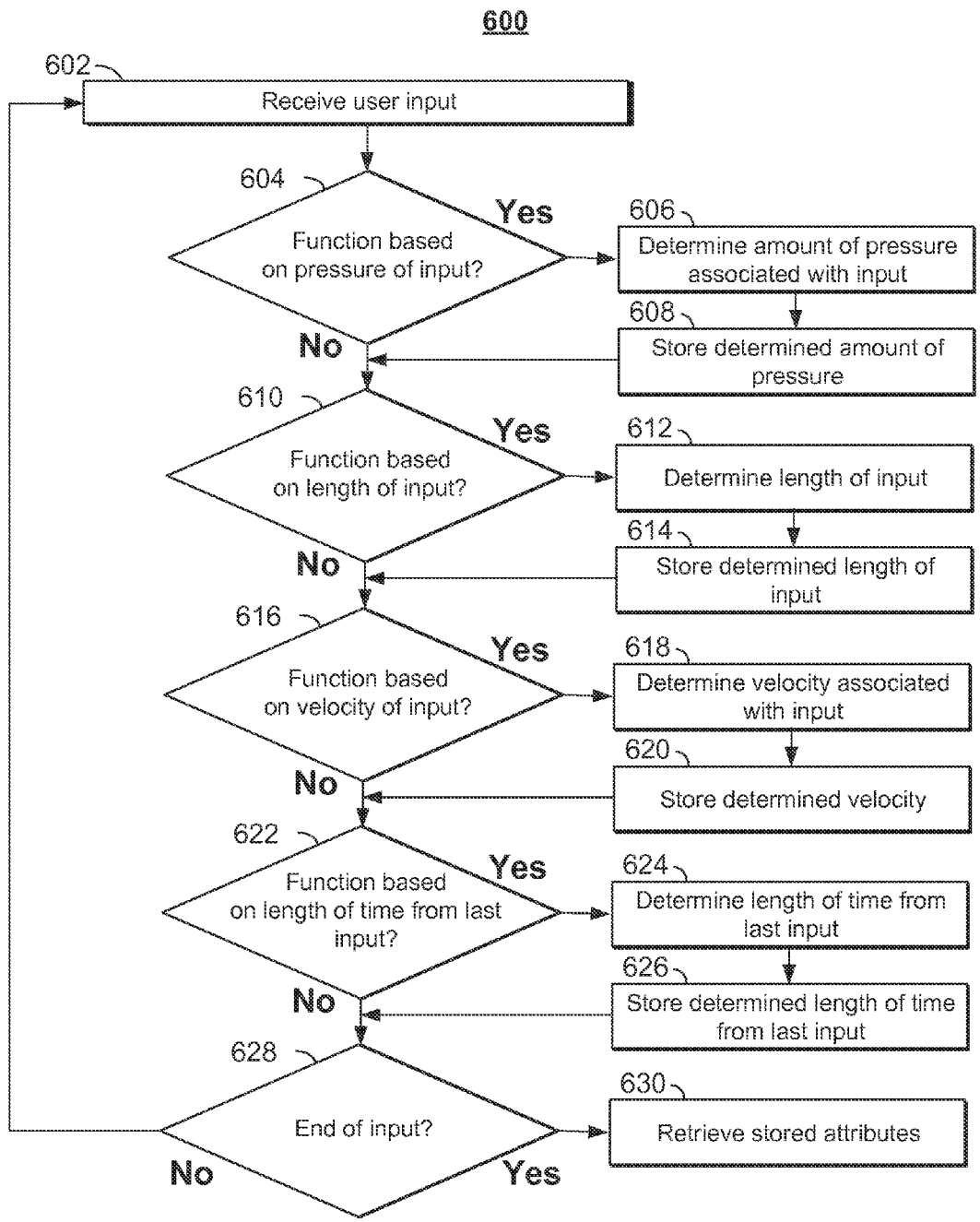
FIG. 6 is a flowchart of illustrative steps for determining tactile attributes associated with a user input in accordance with some embodiments of the disclosure.

FIG. 6 is a flowchart of illustrative steps for determining tactile attributes associated with a user input. It should be noted that process 600 or any step thereof could be performed on, or provided by, any of the devices shown in FIGS. 3-4. For example, process 600 may be executed by control circuitry 304 (FIG. 3) as instructed by a media guidance application implemented on user equipment 402, 404, and/or 406 (FIG. 4) in order to determine tactile attributes associated with a user input. In addition, one or more steps of process 600 may be incorporated into or combined with one or more steps of any other process or embodiment (e.g., process 500 (FIG. 5)).

At step 602, the media guidance application receives a user input. In some embodiments, step 602 may correspond to step 502 (FIG. 5). For example, the media guidance application may receive (e.g., via user input interface 310 (FIG. 3)) a user request (e.g., associated with one or more user inputs) to perform a media guidance function. In some embodiments, the media guidance application may receive the user input and determine (e.g., via control circuitry 304 (FIG. 3)) one or more media guidance functions associated with the particular user input. To select a particular media guidance function to perform from the one or more media guidance functions, the media guidance application may detect (e.g., via a component incorporated into or accessible by user input interface 310 (FIG. 3)) and analyze (e.g., via control circuitry 304 (FIG. 3)) tactile attributes associated with the user input.

At step 604, the media guidance application determines whether or not the function is selected based on the pressure applied by a user during the user input. For example, when entering a user input a user may use varying amounts of force when contacting the user input interface. The media guidance application may detect (e.g., via a component incorporated into or accessible by user input interface 310 (FIG. 3)) a particular amount of force applied by the user and use this amount of force to select a particular media guidance function to perform. If the media guidance application determines that the function is not selected based on the pressure applied by a user during the user input, the media guidance application proceeds to step 610. If the media guidance application determines that the function is selected based on the pressure applied by a user during the user input, the media guidance application proceeds to step 606.

At step 606, the media guidance application determines the amount of pressure associated with the user input. For example, in addition to receiving user inputs, user input interface 310 (FIG. 3)) may detect tactile attributes associated with a user input for use by the media guidance application in determining a function to perform (e.g., obtaining information about a media listing). The media guidance application may quantify this data based on a particular metric as discussed above. For example, in some embodiments, in addition to receiving user instructions via the user input, the media guidance application may receive data (e.g., metadata associated with the user instructions) describing how the user input was received.

At step 608, the media guidance application stores the determined amount of pressure. For example, after determining an amount of pressure associated with the user input, the media guidance application may store (e.g., at storage 308 (FIG. 3) and/or any location accessible via communications network 414 (FIG. 4)) the determined amount. After step 608, the media guidance application proceeds to step 610.

At step 610, the media guidance application determines whether or not the function is selected based on the length of time pressure is applied by a user during the user input. For example, when entering a user input a user may apply pressure for varying amounts of time. The media guidance application may detect (e.g., via a component incorporated into or accessible by user input interface 310 (FIG. 3)) a particular length of time the user applies pressure to the user input interface. If the media guidance application determines that the function is not selected based on the pressure applied by a user during the user input, the media guidance application proceeds to step 616. If the media guidance application determines that the function is selected based on the pressure applied by a user during the user input, the media guidance application proceeds to step 612.

At step 612, the media guidance application determines the particular length of time the user applies pressure to the user input interface. For example, in addition to receiving user inputs, user input interface 310 (FIG. 3)) may detect tactile attributes associated with a user input for use by the media guidance application in determining a function to perform (e.g., changing a user profile setting). The media guidance application may quantify this data based on a particular metric as discussed above. For example, in some embodiments, in addition to receiving user instructions via the user input, the media guidance application may receive data (e.g., metadata associated with the user instructions) describing how the user input was received.

In some embodiments, holding a user input down for a specific amount of time may cause the media guidance application to perform different functions. For example, if the media guidance application determines that a user has held an input down for a first period of time, the media guidance application may perform a first media guidance function (e.g., show a preview clip of a PPV movie), whereas if the media guidance application determines that a user has held an input down for a second period of time, the media guidance application may perform a second media guidance function (e.g., order a presentation of the PPV movie).

At step 614, the media guidance application stores the determined length of time the user applies pressure to the user input interface. For example, after determining the particular length of time the user applies pressure to the user input interface, the media guidance application may store (e.g., at storage 308 (FIG. 3) and/or any location accessible via communications network 414 (FIG. 4)) the determined length. After step 614, the media guidance application proceeds to step 616.

At step 616, the media guidance application determines whether or not the function is selected based on the velocity of a user input. For example, when entering a user input a user may use varying amounts of speed when contacting the user input interface. The media guidance application may detect (e.g., via a component incorporated into or accessible by user input interface 310 (FIG. 3)) the velocity of the user input to select a particular media guidance function to perform. If the media guidance application determines that the function is not selected based on velocity of the user input, the media guidance application proceeds to step 622. If the media guidance application determines that the function is selected based on velocity of the user input, the media guidance application proceeds to step 618 and determines velocity.

In some embodiments, a fast entry of an input (e.g., associated with a high velocity) may cause the media guidance application to perform a different function than a slow entry of an input (e.g., associated with a low velocity). For example, if the media guidance application determines that a user has quickly pressed a key associated with an alphanumeric character for use in a search tool, the media guidance application may automatically perform spelling corrections. In contrast, if the media guidance application determines that a user has slowly and deliberately pressed a key associated with an alphanumeric character for use in a search tool, the media guidance application may not perform any spelling correction.

At step 618, the media guidance application determines velocity associated with the user input. For example, in addition to receiving user inputs, user input interface 310 (FIG. 3)) may detect tactile attributes associated with a user input for use by the media guidance application in determining a function to perform (e.g., turning a user device on or off). The media guidance application may quantify this data based on a particular metric as discussed above. For example, in some embodiments, in addition to receiving user instructions via the user input, the media guidance application may receive data (e.g., metadata associated with the user instructions) describing how the user input was received.

At step 620, the media guidance application stores the determined velocity of the user input. For example, after determining the velocity associated with the user input, the media guidance application may store (e.g., at storage 308 (FIG. 3) and/or any location accessible via communications network 414 (FIG. 4)) the determined velocity. After step 620, the media guidance application proceeds to step 622.

At step 622, the media guidance application determines whether or not the function is selected based on the length of time from the last user input. For example, a user may enter user inputs at varying frequencies. The media guidance application may detect (e.g., via a component incorporated into or accessible by user input interface 310 (FIG. 3)) the length of time from the last user input to select a particular media guidance function to perform. If the media guidance application determines that the function is not selected based on the length of time from the last user input, the media guidance application proceeds to step 628. If the media guidance application determines that the function is selected based on the length of time from the last user input, the media guidance application proceeds to step 624 and determines the length of time from the last user input that is associated with the user input.

At step 624, the media guidance application determines the length of time from the last user input. For example, in addition to receiving user inputs, user input interface 310 (FIG. 3)) may detect tactile attributes associated with a user input for use by the media guidance application in determining a function to perform (e.g., generating a presentation of one or more media assets). The media guidance application may quantify this data based on a particular metric as discussed above. For example, in some embodiments, in addition to receiving user instructions via the user input, the media guidance application may receive data (e.g., metadata associated with the user instructions) describing how the user input was received.

In some embodiments, the repeated entry of the same user input may cause the media guidance application to perform particular functions. For example, if the media guidance application determines that a user has recently increased the frequency of entry of a particular user input (e.g., the user is rapidly pressing an input associated with a channel scan or menu scroll), the media guidance application may increase a property associated with that media guidance function (e.g., the media guidance application may increase the speed at which the channel scan or menu scroll is performed).

At step 626, the media guidance application stores the determined length of time from the last user input. For example, after determining the length of time from the last user input, the media guidance application may store (e.g., at storage 308 (FIG. 3) and/or any location accessible via communications network 414 (FIG. 4)) the determined length of time. After step 626, the media guidance application proceeds to step 628.

At step 628, the media guidance application determines whether or not the user has ended the user input. If the media guidance application determines that the user input has not ended (e.g., a user is still applying pressure to the user input), the media guidance application returns to step 602. For example, the media guidance application may continuously determine the tactile attributes during a user input. While the media guidance application continuously determines the tactile attributes associated with the user input, the media guidance application may continuously update the stored tactile attributes. For example, the media guidance application may perform multiple iterations of process 600 while a user enters a user input.

In some embodiments, as the stored tactile attributes are updated, a media guidance function selected and/or performed by the media guidance application may change. For example, during a first iteration of process 600, the media guidance application may detect a user has applied pressure to a user input (e.g., associated with a channel change request) for a first period of time. Based on this period of time, the media guidance application may generate a display of a new channel in a PIP window overlaid on the current channel. During a second iteration of process 600, the media guidance application may detect that the user is still applying pressure to the same user input. The length of time pressure has been applied to the user input now corresponds to a second period of time. Based on this period of time, the media guidance application may generate a full-screen display of the new channel with a PIP window overlay featuring the previous channel.

During a third iteration of process 600, the media guidance application may detect that the user is still applying pressure to the same user input. The length of time pressure has been applied to the user input now corresponds to a third period of time. Based on this period of time, the media guidance application may generate a full-screen display of the new channel without a PIP window overlay featuring the previous channel.

If the media guidance application determines that the user input has ended, the media guidance application proceeds to step 630 and retrieves the stored attributes. The media guidance application may then select a function based on the one or more stored attributes (e.g., as discussed above in relation to process 500 (FIG. 5)).

It is contemplated that the steps or descriptions of FIG. 6 may be used with any other embodiment of this disclosure. In addition, the steps and descriptions described in relation to FIG. 6 may be done in alternative orders or in parallel to further the purposes of this disclosure. For example, each of these steps may be performed in any order or in parallel or substantially simultaneously to reduce lag or increase the speed of the system or method. Furthermore, it should be noted that any of the devices or equipment discussed in relation to FIGS. 3-4 could be used to perform one of more of the steps in FIG. 6.

The above-described embodiments of the present disclosure are presented for purposes of illustration and not of limitation, and the present disclosure is limited only by the claims which follow. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real-time. It should also be noted, the systems and/or methods described above may be applied to, or used in accordance with, other systems and/or methods.

What is claimed is:

1. A method for selecting media guidance functions based on tactile attributes, the method comprising:
receiving a first user input;
storing a first timestamp associated with the first user input;
receiving a second user input;
storing a second timestamp associated with the second user input;
determining an amount of pressure applied by a user associated with the second user input;
calculating a first length of time between the first timestamp and the second timestamp;
storing a database of a plurality of records, wherein each record of the plurality of records includes a media guidance function listing, a pressure attribute, and a corresponding time length attribute, and wherein each media guidance function listing is associated with a media guidance function of a plurality of media guidance functions;
searching the database for a target record of the plurality of records for which the pressure attribute matches the amount of pressure applied by the user and for which the time length attribute matches the first length of time;
selecting an intended media guidance function corresponding to the media guidance function listing of the target record of the plurality of records;
retrieving the intended media guidance function; and
performing the intended media guidance function in response to the second user input.

2. The method of claim 1, wherein each of the plurality of media guidance functions is associated with a different fast-access playback operation.

3. The method of claim 2, wherein a first fast-access playback operation is a rewind operation, and a second fast-access playback operation is a start over operation.

4. The method of claim 1, wherein each of the plurality of media guidance functions is associated with a different fast-access playback operation speed.

5. The method of claim 4, wherein a first fast-access playback operation speed indicates a first number of frames skipped during the fast-access playback operation, and a second fast-access playback operation speed indicates a second number of frames skipped during the fast-access playback operation.

6. The method of claim 1, wherein a first media guidance function of the plurality of media guidance functions relates to replacing current content with new content on a display device, and a second media guidance function of the plurality of media guidance functions relates to presenting the new content simultaneously with the current content on the display device.

7. The method of claim 6, wherein the second media guidance function of the plurality of media guidance functions relates to presenting the new content in a picture-in-a-picture window overlaid on the current content.

8. The method of claim 1, wherein each of the plurality of media guidance functions is associated with a different channel scan speed.

9. The method of claim 1, wherein each of the plurality of media guidance functions is associated with a different number of user devices affected by the media guidance function.

10. The method of claim 1, further comprising:
determining a second length of time the amount of pressure is applied by the user; and
selecting the media guidance function based on the second length of time the amount of pressure is applied by the user.

11. A system for selecting media guidance functions based on tactile attributes, the system comprising control circuitry that:
receives a first user input;
stores a first timestamp associated with the first user input;
receives a second user input;
stores a second timestamp associated with the second user input;
determines an amount of pressure applied by a user associated with the second user input;
calculates a first length of time between the first timestamp and the second timestamp;
stores a database of a plurality of records, wherein each record of the plurality of records includes a media guidance function listing, a pressure attribute, and a corresponding time length attribute, and wherein each media guidance function listing is associated with a media guidance function of a plurality of media guidance functions;
searches the database for a target record of the plurality of records for which the pressure attribute matches the amount of pressure applied by the user and for which the time length attribute matches the first length of time;
selects an intended media guidance function corresponding to the media guidance function listing of the target record of the plurality of records;
retrieves the intended media guidance function; and
performs the intended media guidance function in response to the second user input.

12. The system of claim 11, wherein each of the plurality of media guidance functions is associated with a different fast-access playback operation.

13. The system of claim 12, wherein a first fast-access playback operation is a rewind operation, and a second fast-access playback operation is a start over operation.

14. The system of claim 11, wherein each of the plurality of media guidance functions is associated with a different fast-access playback operation speed.

15. The system of claim 14, wherein a first fast-access playback operation speed indicates a first number of frames skipped during the fast-access playback operation, and a second fast-access playback operation speed indicates a second number of frames skipped during the fast-access playback operation.

16. The system of claim 11, wherein a first media guidance function of the plurality of media guidance functions relates to replacing current content with new content on a display device, and a second media guidance function of the plurality of media guidance functions relates to presenting the new content simultaneously with the current content on the display device.

17. The system of claim 16, wherein the second media guidance function of the plurality of media guidance functions relates to presenting the new content in a picture-in-a-picture window overlaid on the current content.

18. The system of claim 11, wherein each of the plurality of media guidance functions is associated with a different channel scan speed.

19. The system of claim 11, wherein each of the plurality of media guidance functions is associated with a different number of user devices affected by the media guidance function.

20. The system of claim 11, wherein the control circuitry:
   determines a second length of time the amount of pressure is applied by the user; and
   selects the media guidance function based on the second length of time the amount of pressure is applied by the user.

* * * * *